US008127021B2

(12) United States Patent
Lankford et al.

(10) Patent No.: US 8,127,021 B2
(45) Date of Patent: Feb. 28, 2012

(54) CONTENT AWARE ROUTING OF SUBSCRIPTIONS FOR STREAMING AND STATIC DATA

(75) Inventors: Peter Lankford, Chicago, IL (US); Andrew MacGaffey, Carol Stream, IL (US)

(73) Assignee: MetaFluent, LLC, Warrenville, IL (US)

( * ) Notice: Subject to any disclaimer, the term of this patent is extended or adjusted under 35 U.S.C. 154(b) by 132 days.

(21) Appl. No.: 12/225,044

(22) PCT Filed: Mar. 14, 2007

(86) PCT No.: PCT/US2007/006426
§ 371 (c)(1),
(2), (4) Date: Sep. 12, 2008

(87) PCT Pub. No.: WO2007/109047
PCT Pub. Date: Sep. 27, 2007

(65) Prior Publication Data
US 2009/0204712 A1  Aug. 13, 2009

Related U.S. Application Data

(60) Provisional application No. 60/783,369, filed on Mar. 18, 2006.

(51) Int. Cl.
G06F 15/16 (2006.01)
(52) U.S. Cl. ........................................ 709/227; 709/203
(58) Field of Classification Search .......... 709/200–203, 709/217–227, 228, 229
See application file for complete search history.

(56) References Cited

U.S. PATENT DOCUMENTS 6,401,121 B1 * 6/2002 Yoshida et al. ............... 709/227
(Continued)

Primary Examiner — Moustafa M Meky
(74) Attorney, Agent, or Firm — Squire, Sanders & Dempsey (US) LLP

(57) ABSTRACT

The invention relates to integration of streaming data, and more specifically relates to subscription routing: distributing the load of streaming data subscriptions across multiple servers in a session-oriented client-server architecture. In one embodiment the invention provides, in a client-server architecture, a method of implementing the client-side architecture whereby a logical connection and session may be mapped to one or more physical connections and sessions. The invention provides mobility of subscriptions from one physical session/connection to another based on directives from a server; and further permit a client to blend multiple physical subscriptions for different data streams into a single logical data stream based on directives from a server.

31 Claims, 20 Drawing Sheets

U.S. PATENT DOCUMENTS

| | | | |
|---|---|---|---|
| 6,633,914 B1 | 10/2003 | Bayeh et al. | |
| 6,671,259 B1 * | 12/2003 | He et al. | 370/238 |
| 6,965,938 B1 * | 11/2005 | Beasley et al. | 709/229 |
| 7,181,731 B2 | 2/2007 | Pace et al. | |
| 7,200,675 B2 | 4/2007 | Wang et al. | |
| 7,287,090 B1 * | 10/2007 | Berg | 709/238 |
| 7,403,993 B2 * | 7/2008 | John et al. | 709/226 |
| 7,512,686 B2 * | 3/2009 | Berg | 709/227 |
| 7,546,369 B2 * | 6/2009 | Berg | 709/227 |
| 7,620,687 B2 * | 11/2009 | Chen et al. | 709/205 |
| 7,649,876 B2 * | 1/2010 | Berg | 370/352 |
| 7,698,398 B1 | 4/2010 | Lai | |
| 7,702,739 B1 | 4/2010 | Cheng et al. | |
| 7,747,678 B2 | 6/2010 | Mehra et al. | |
| 7,814,470 B2 | 10/2010 | Mamou et al. | |
| 7,831,693 B2 | 11/2010 | Lai | |
| 2001/0016880 A1 | 8/2001 | Cai et al. | |
| 2002/0154646 A1 | 10/2002 | Dubois et al. | |
| 2003/0018694 A1 | 1/2003 | Chen et al. | |
| 2003/0093470 A1 | 5/2003 | Upton | |
| 2003/0105797 A1 * | 6/2003 | Dolev et al. | 709/105 |
| 2003/0229900 A1 | 12/2003 | Reisman | |
| 2004/0122892 A1 | 6/2004 | Brittenham et al. | |
| 2004/0221261 A1 | 11/2004 | Blevins | |
| 2005/0228808 A1 | 10/2005 | Mamou et al. | |
| 2006/0047751 A1 * | 3/2006 | Chen et al. | 709/205 |
| 2006/0069717 A1 | 3/2006 | Mamou et al. | |
| 2006/0123425 A1 | 6/2006 | Ramarao et al. | |
| 2006/0129684 A1 * | 6/2006 | Datta | 709/229 |
| 2006/0277413 A1 * | 12/2006 | Drews | 713/189 |
| 2007/0043834 A1 | 2/2007 | Barnerjee | |
| 2007/0086360 A1 * | 4/2007 | Berg | 370/254 |
| 2007/0124362 A1 | 5/2007 | Kren | |
| 2007/0191033 A1 | 8/2007 | Marais | |
| 2009/0070489 A1 * | 3/2009 | Lu et al. | 709/245 |
| 2009/0282149 A1 * | 11/2009 | Kumbalimutt et al. | 709/226 |
| 2010/0070650 A1 | 3/2010 | MacGaffey et al. | |

\* cited by examiner

1701. Step 1 Client requests [Server] permission to publish/subscribe to Destination 1702 Step 2 Server determines
   a) permission and
   b) eligibility of Destination for Optimization 1703 Step 3 If not eligible: then Client transmits message to Server w/o optimization; if eligible, go to step 4.

1704 Step 4 Message is optimized by the sub steps of:

a) Server determines that Client has Destination Specific Dictionary [DSD]
b) Server sends DSD to Client Session;
c) Client saves Destination specific dictionary for session-life
d) Server sends reference to DSD for Destination
e) Client uses reference to associate DSD with Destination
f) Server sends message to Client using coding implied by dictionary as appropriate to DSD for the particular Destination
g) Client interprets Server message using meta-data from DSD;
h) Client represents meta-data message to JMS API as MapMessageObjects;
i) Client transmits optimized message to Server; and
j) Sever may send Client a new DSD followed y a reference to that DSD for some Destination.

CONTENT AWARE ROUTING OF SUBSCRIPTIONS FOR STREAMING AND STATIC DATA

RELATED APPLICATIONS

This application claims priority from U.S. provisional application 60/783,369 filed Mar. 18, 2006, the entirety of which is incorporated by reference as if fully set forth herein.

GOVERNMENT FUNDING

Not applicable.

BACKGROUND

1. Field of the Invention

The invention generally relates to the field of streaming data over a network and more specifically, the automating of business processes driven by real-time information. Further this invention relates to electronic message delivery involving multiple data streams and multiple clients.

2. Description of Related Art

Resource allocation is one of the on-going challenges faced by enterprises streaming data to multiple clients. Current approaches handle streaming data by routing only though the initial connection or session, and thereby effectively route all data-streams for a session through the same resources. Moreover, methods employing request-specific routing are limited to static data and do-not satisfy streaming data demands. Other approaches to dynamic routing, (see, for example, U.S. Pat. No. 7,039,671) have limited practical application. Another difficulty with current methods is the treatment of each "topic" as equal. However, as between topics, the load induced may vary greatly: update rates differ, varying amounts of value-added calculation, as well as different qualities of service and, possibly, widely variable latency requirements What is needed is a more efficient method of routing streaming data, such that load is distributed dynamically.

SUMMARY OF INVENTION

The invention taught herein meets at least all the above-stated needs.

The invention provides an efficient method of routing streaming data, such that load is distributed dynamically. The invention provides a method of automatic, dynamic load balancing, responsive to data volume fluctuations, changes in usage patterns or resources. The invention further provides a "plug-in" routing mechanism.

In one embodiment the invention provides, in a client-server architecture, a method of implementing the client-side architecture whereby a logical connection and session may be mapped to one or more physical connections and sessions. In an embodiment according to the invention, in a client-side architecture along with associated network protocols, the invention provides mobility of subscriptions from one physical session/connection to another based on directives from a server; and further permit a client to blend multiple physical subscriptions for different data streams into a single logical data stream based on directives from a server.

In the preferred embodiment, the invention further provides a method for load balancing data in an integration system for streaming and static data, said method comprising: a content integration logic integrating both high-throughput streaming and static content originating from multiple types and/or instances of data sources into discrete units of data.

In the preferred embodiment, the invention also provides a method for managing streaming data as between a data source and a data receiver, wherein a session oriented client-server architecture and streaming data integration logic providing streaming data subscriptions across multiple servers.

Further, the invention provides a server-side routing mechanism that distributes subscription requests across multiple servers based on any or all of the following: subscription names; server load; the current or expected load of each server and the expected incremental load imposed by the subscription, where load includes the utilization of resources such as CPU, storage, and networks.

The method provides novel interfaces and protocols, and any server can act as a routing server for any request. In a preferred embodiment, the system administrator can choose to deploy the architecture in ay combination of content servers and routing capability. A specific set of servers can be configured as routing servers.

The client library sends a topic request to a server, which may satisfy the request itself (i.e., act as the content server) or re-route the request to another server. At any point in time, a single client may be connected to several different content servers.

Furthermore, the inventive method provides that some topics may be split among multiple servers. For example, a topic that resolves to real-time data sourced from a direct exchange feed coupled with reference data sourced from a relational database could be routed to two places: a direct feed that publishes via a multicast protocol and a database-connected server that publishes via TCP; the client library joins the data and presents them to the application as a single topic.

Any system using the method taught herein may be configured to initiate its own rebalancing when necessary, where that is permitted by the sessions. Moreover, the inventive method can work with any other session-oriented paradigm that uses a publish-subscribe paradigm.

The invention provides for enabling arbitrarily sophisticated, pluggable algorithms for request routing (including heuristic algorithms).

BRIEF DESCRIPTION OF THE DRAWINGS

The present invention will be understood and appreciated more fully from the following detailed description taken in conjunction with the drawings.

FIG. 8 is a depiction of subscription initialization with a Mapping Plug-in.

FIG. 9 is a depiction of subscription initialization with the Managed Content Plug-in.

FIG. 15 illustrates a Mapping Plug-in.

FIG. 16 illustrates a Managed Content Plug-in.

FIG. 17 is a flowchart illustrating a protocol according to a preferred embodiment.

DETAILED DESCRIPTION OF THE PREFERRED EMBODIMENT

Figure 1:
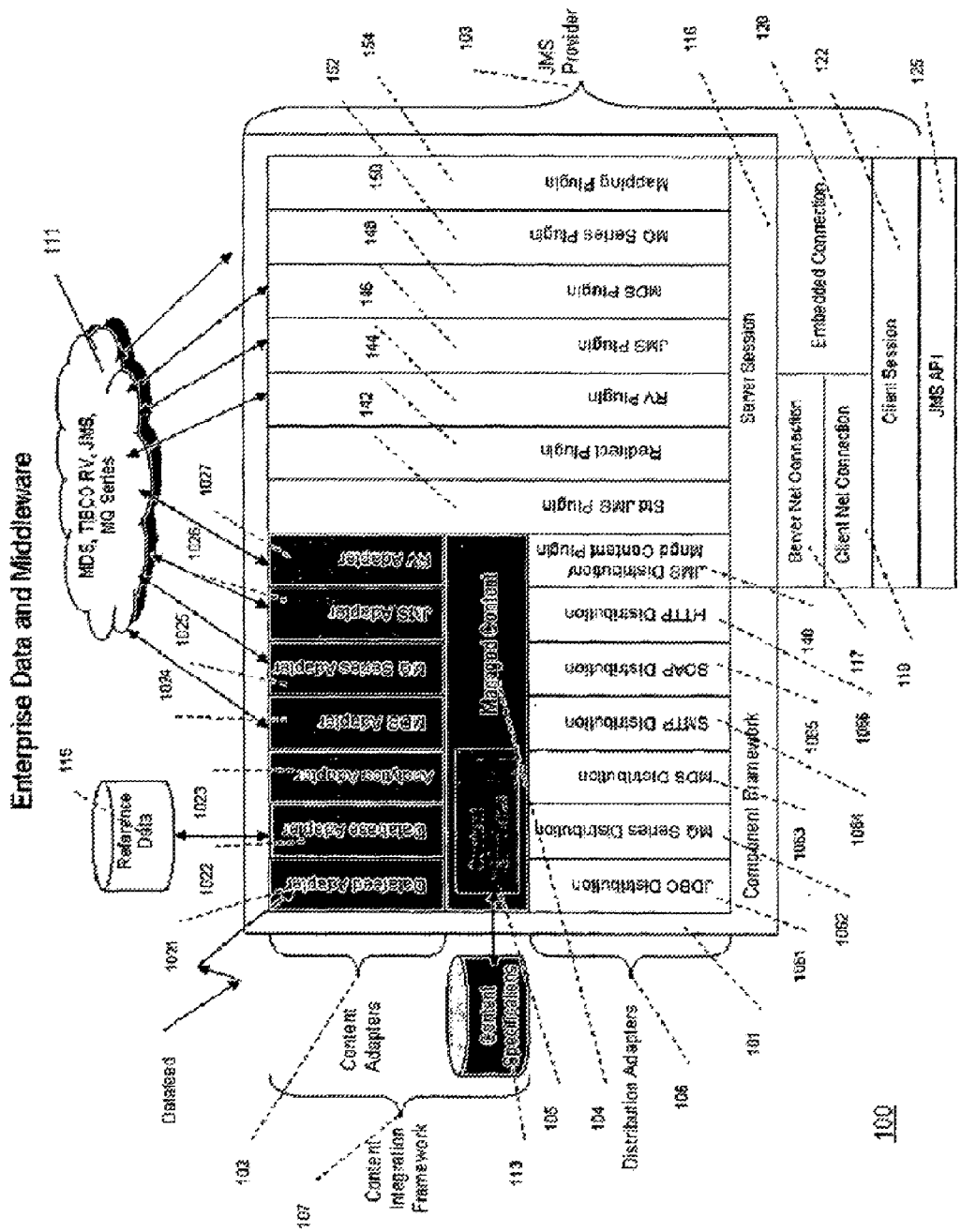
FIG. 1 shows the generalized architecture of a system according to a preferred embodiment.
Figure 2:
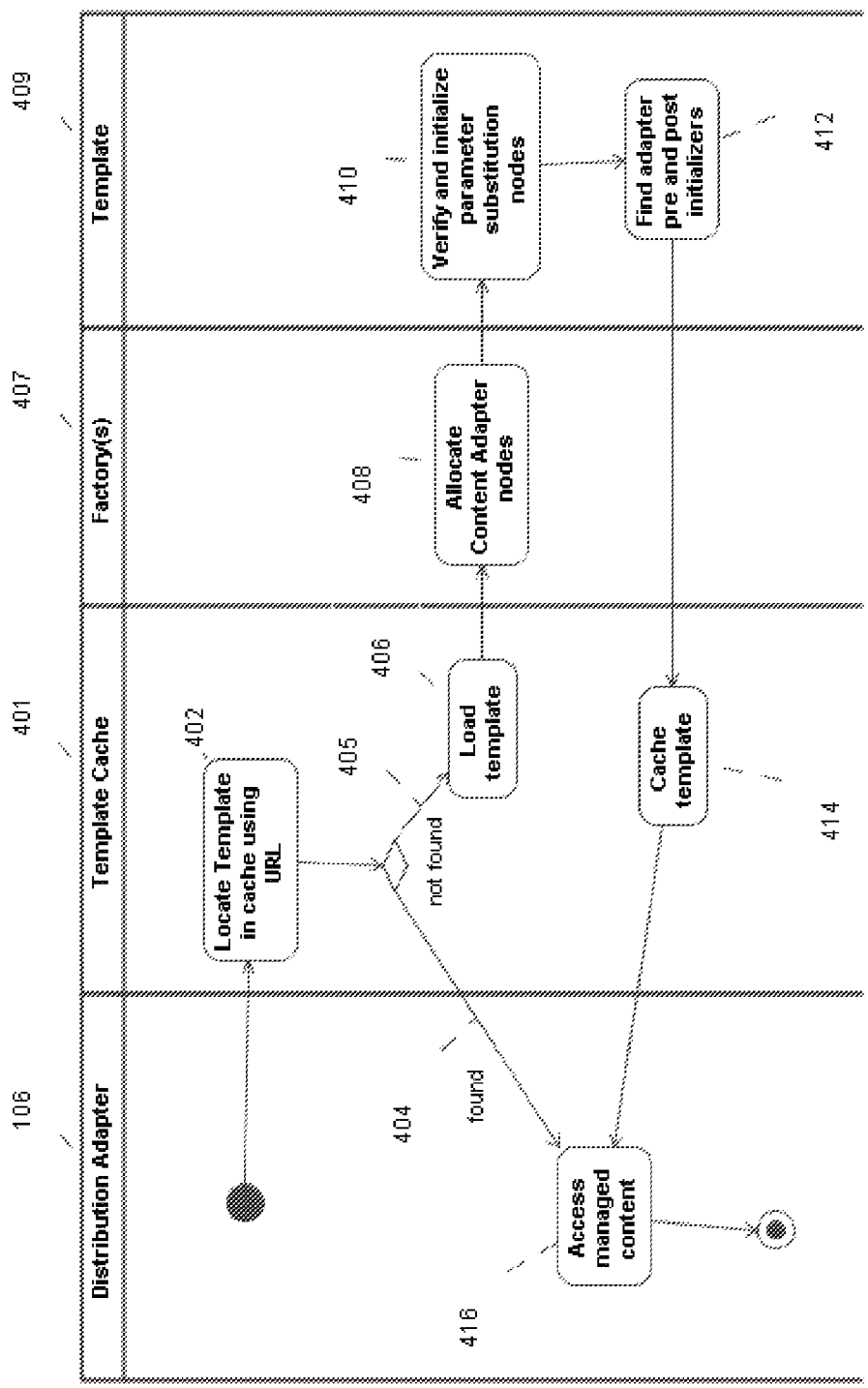
FIG. 2 represents the process of accessing a template according to a preferred embodiment.
Figure 3:
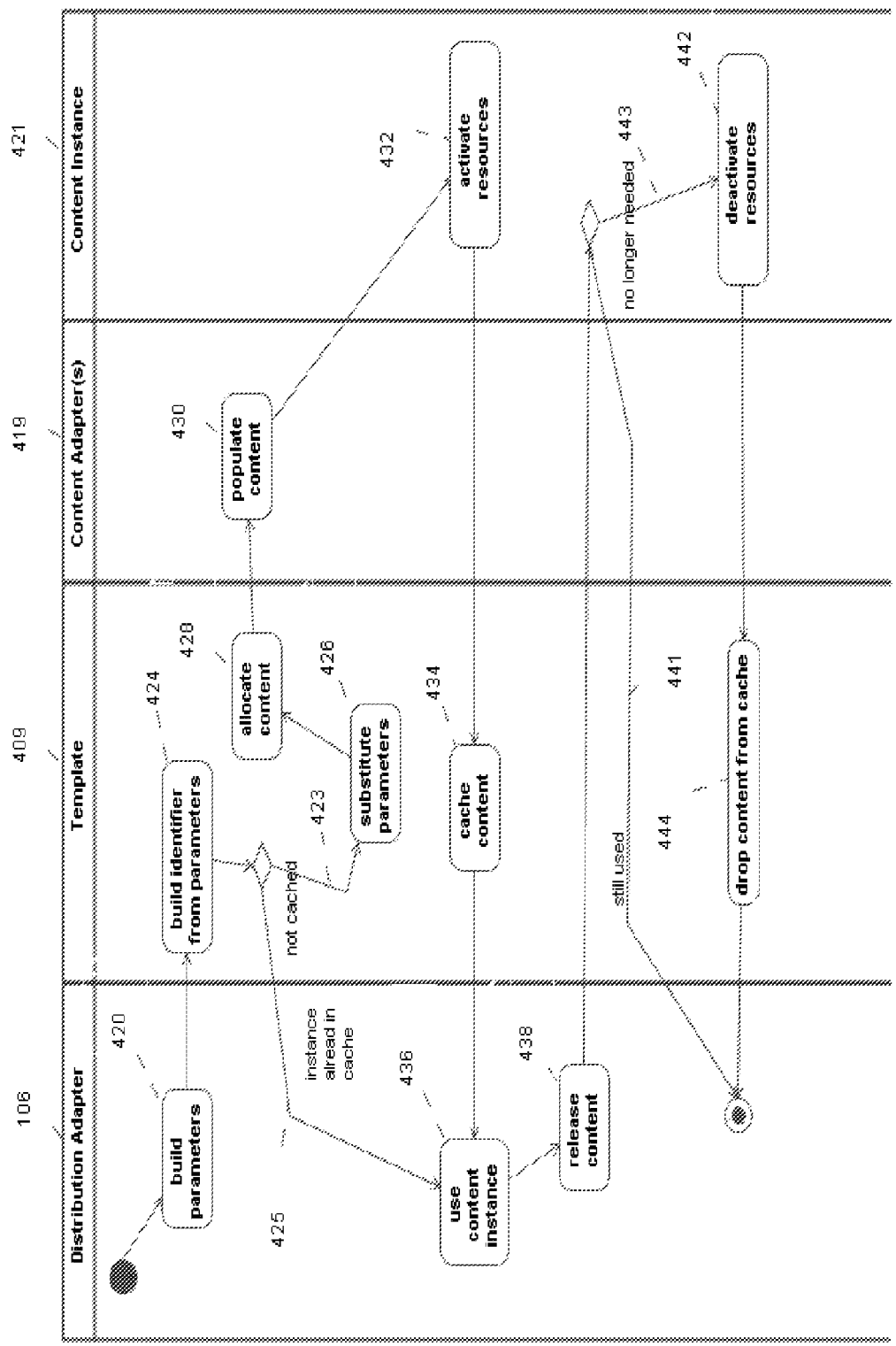
FIG. 3 represents access to a Content Instance.
Figure 4:
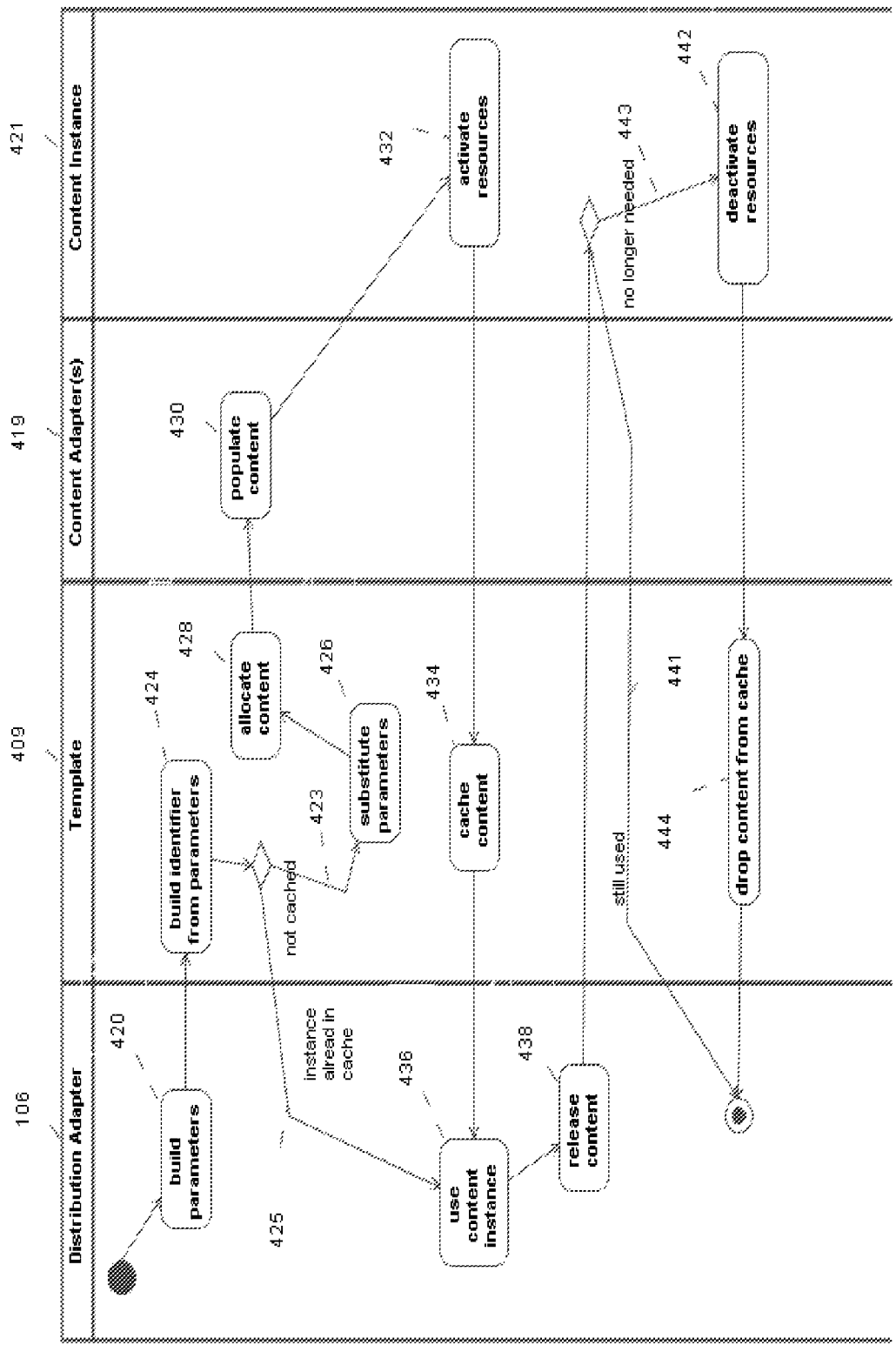
FIG. 4 represents the sequence of event handling.
Figure 5:
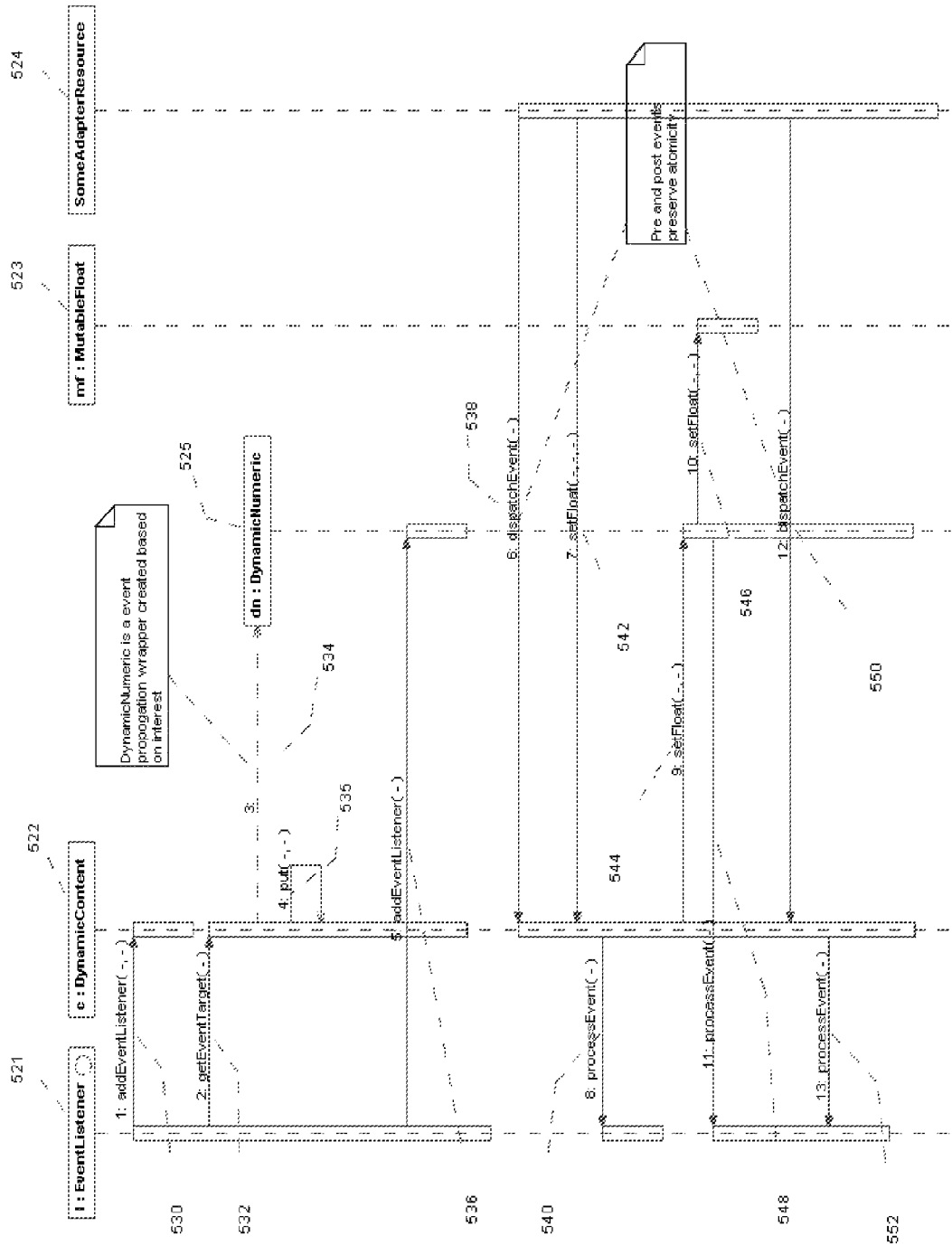
FIG. 5 depicts FIG. 4 in a UML sequence diagram showing setup and adapter event handling.
Figure 6:
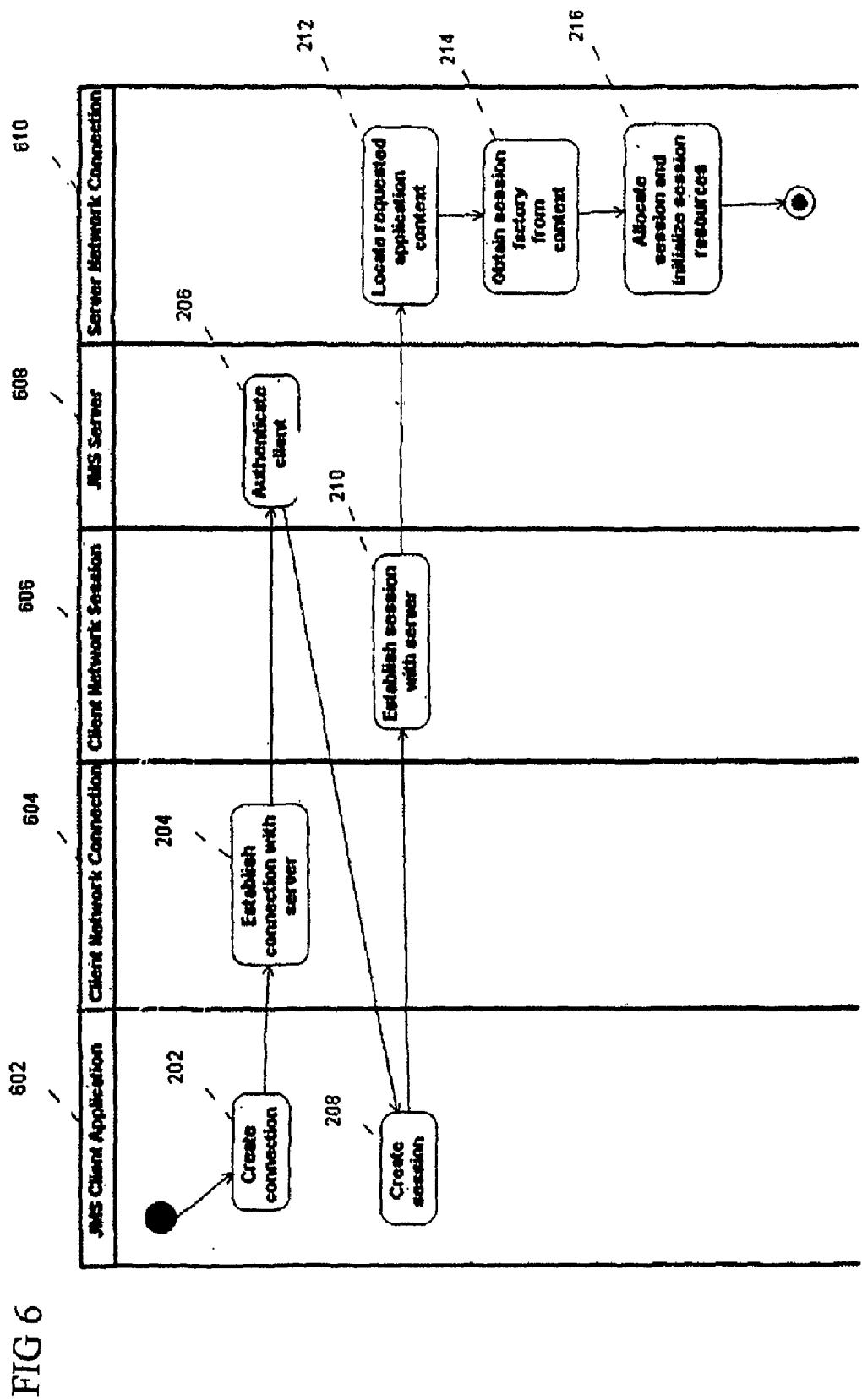
FIG. 6 depicts session initialization.
Figure 7:
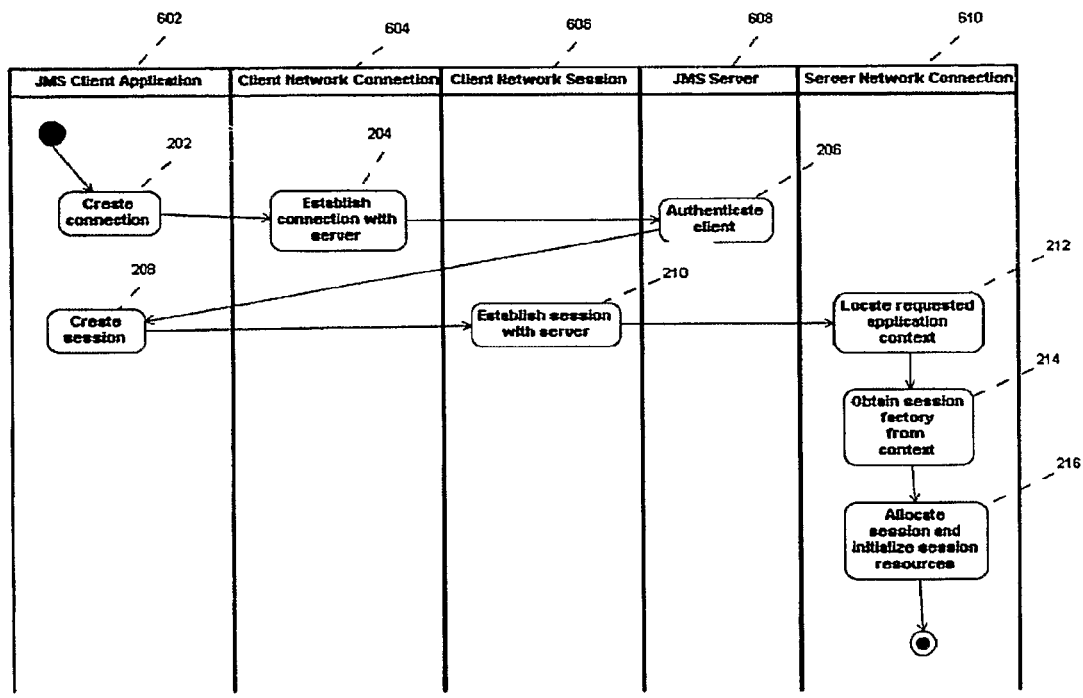
FIG. 7 is a generalized depiction of subscription initialization.
Figure 8:
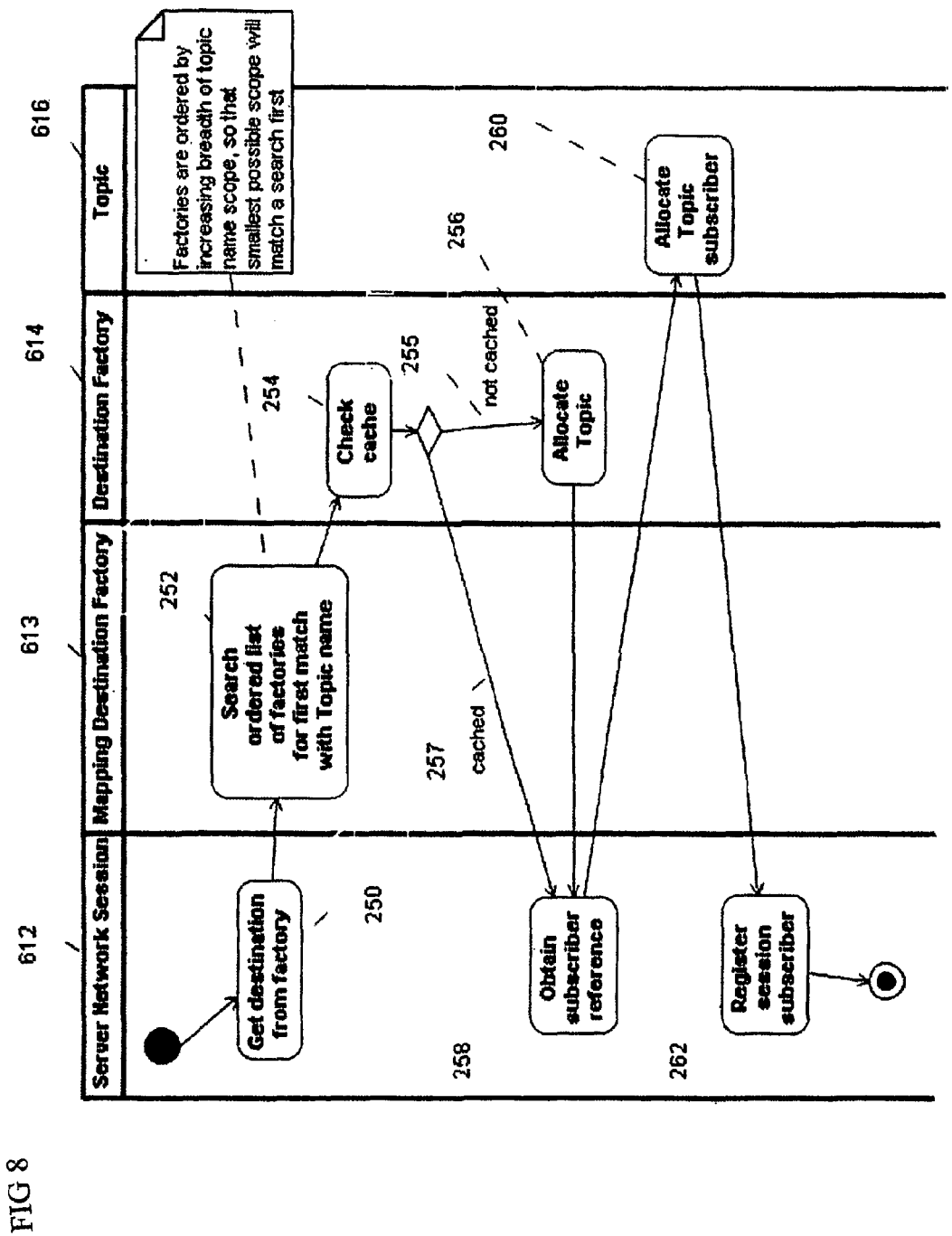
Figure 9:
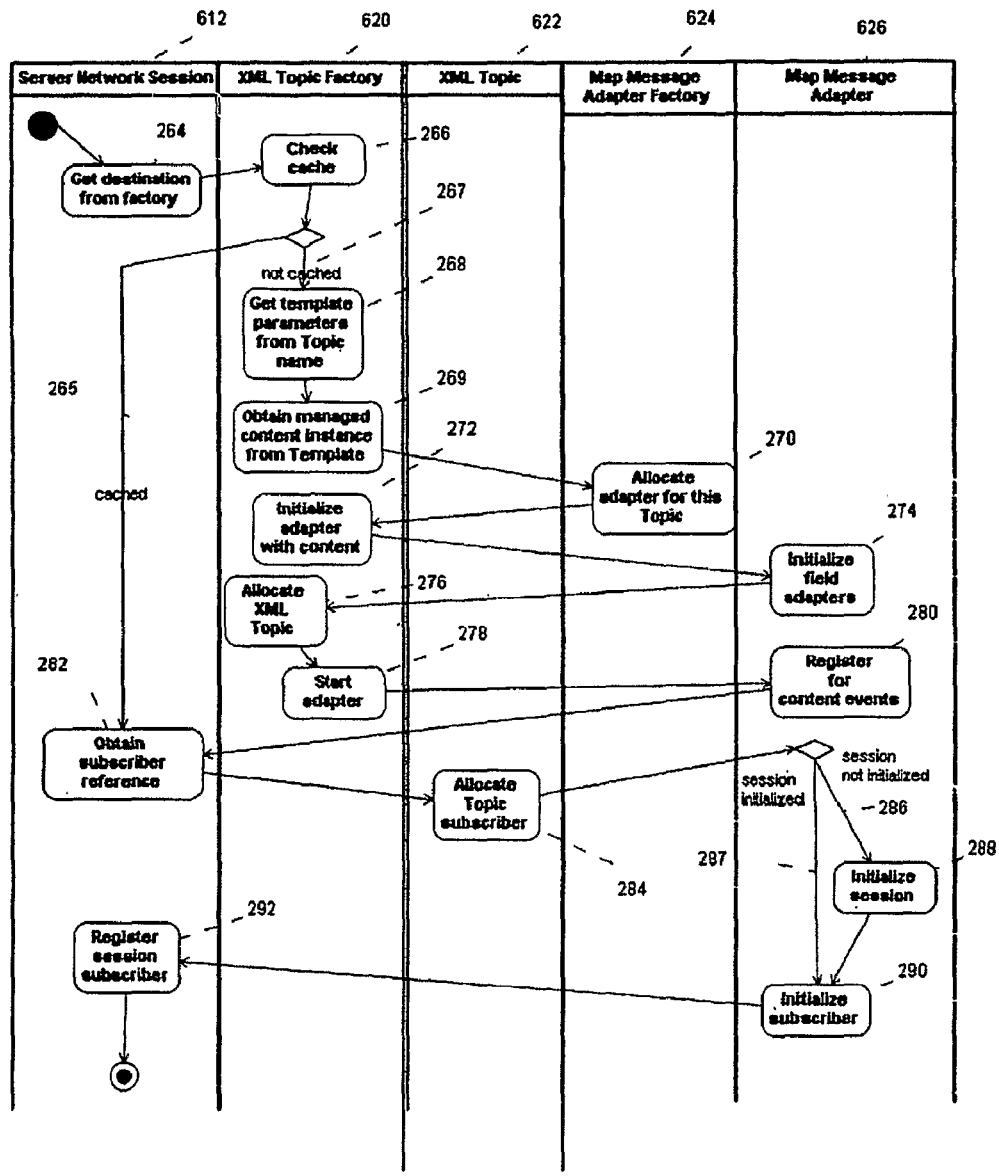
Figure 10:
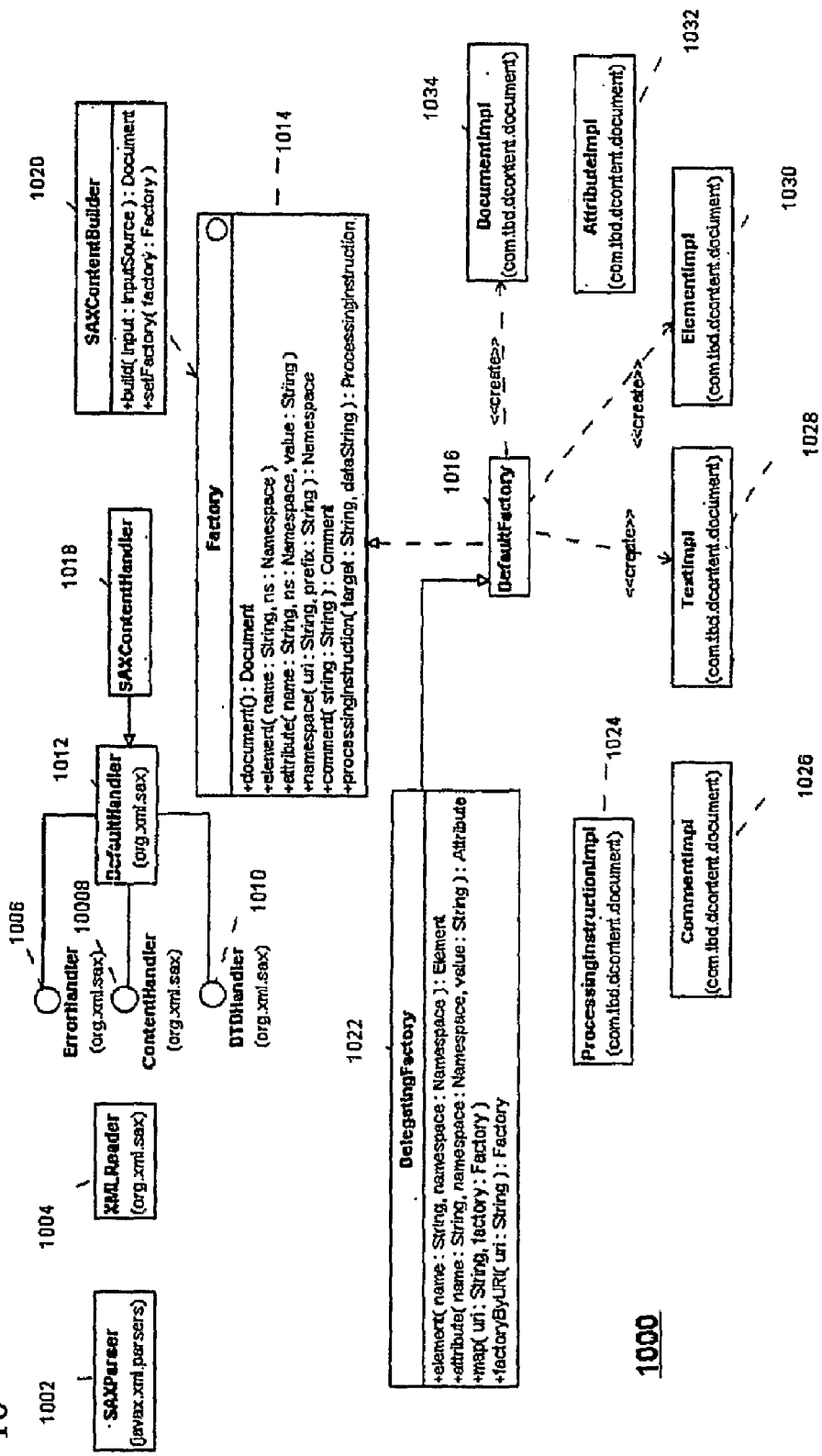
FIG. 10 illustrates the "Factory" Construct.
Figure 11:
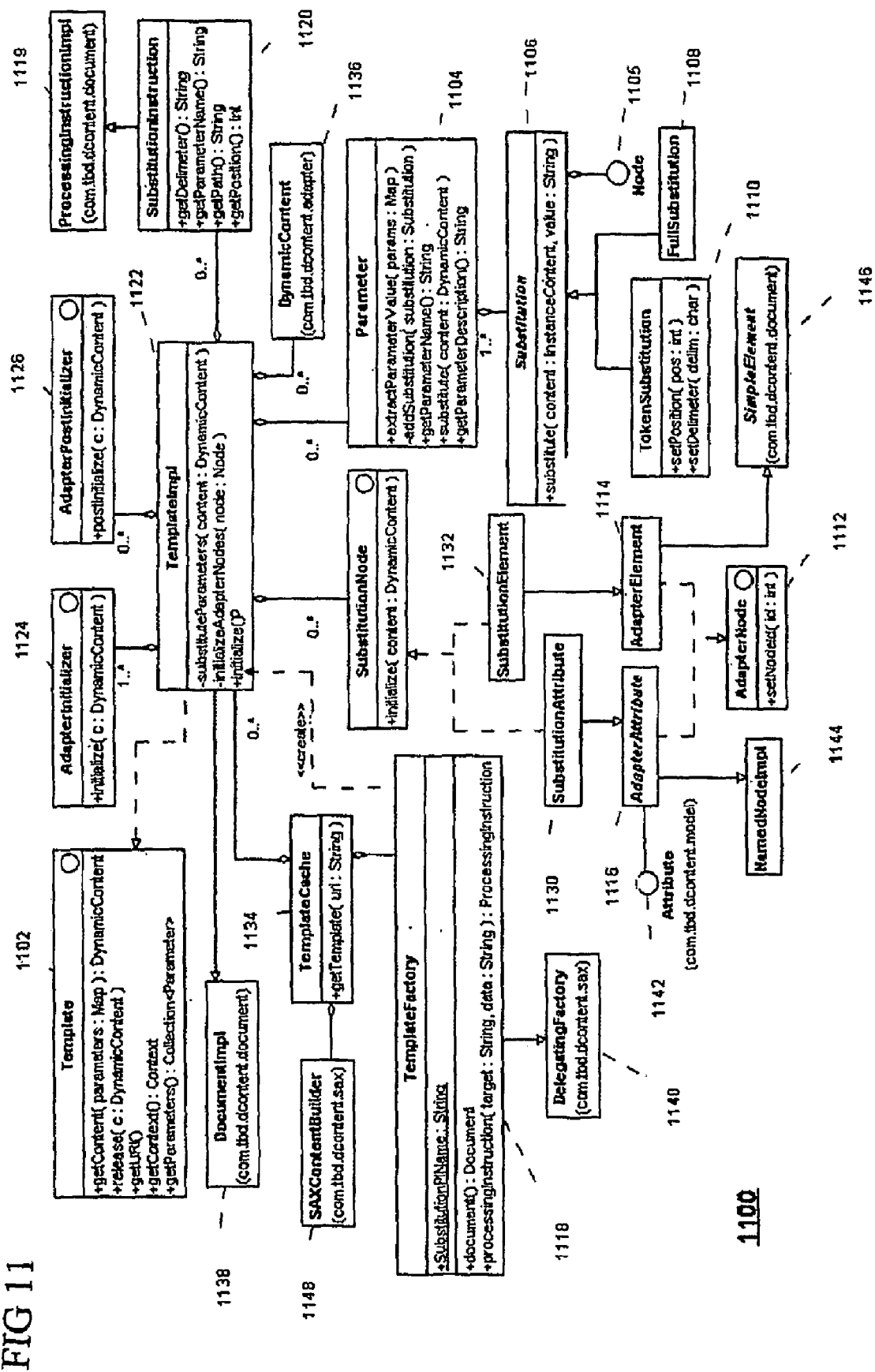
FIG. 11 illustrates Content Templates.
Figure 12:
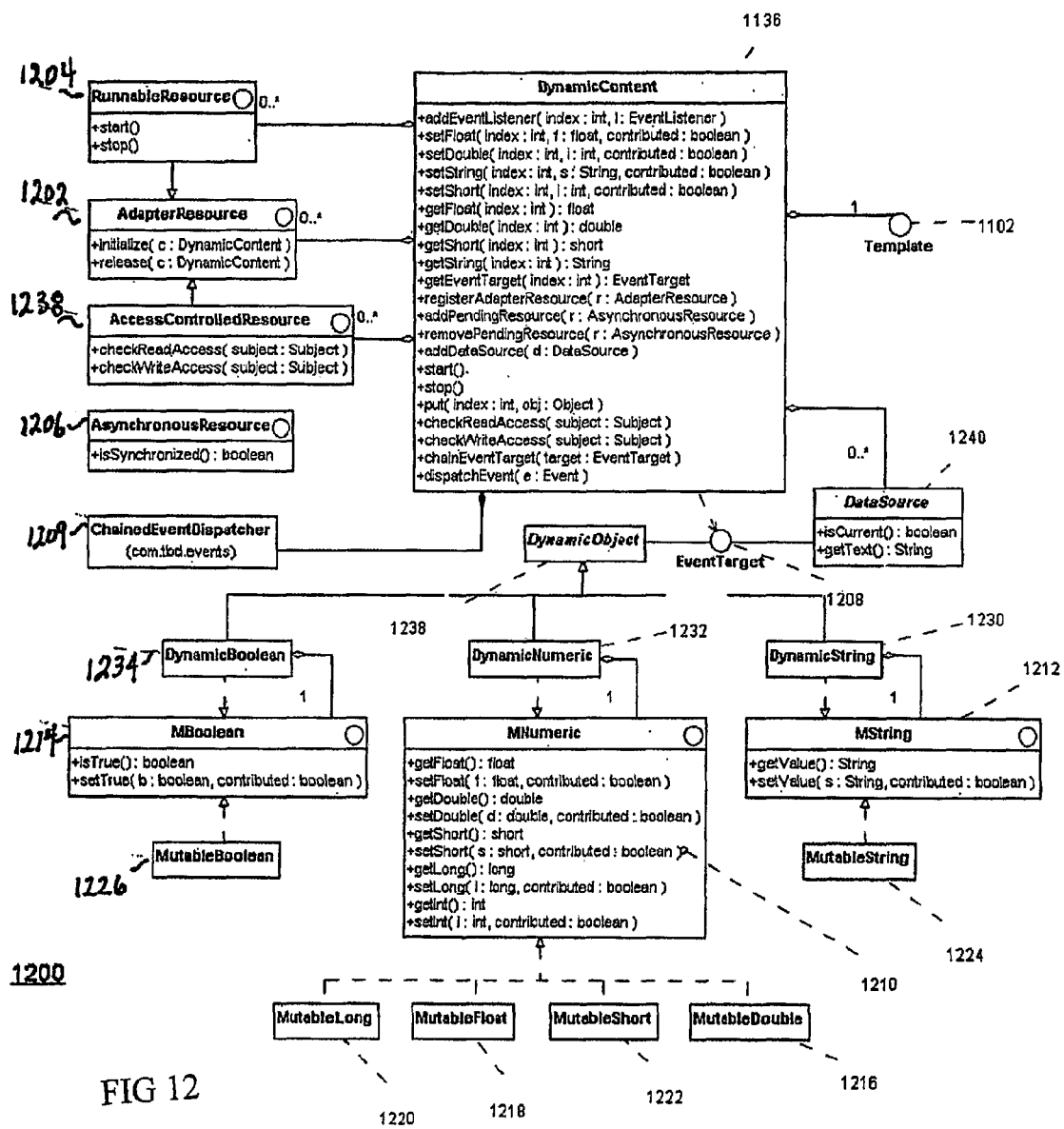
FIG. 12 illustrates a Content Instance according to one embodiment.
Figure 13:
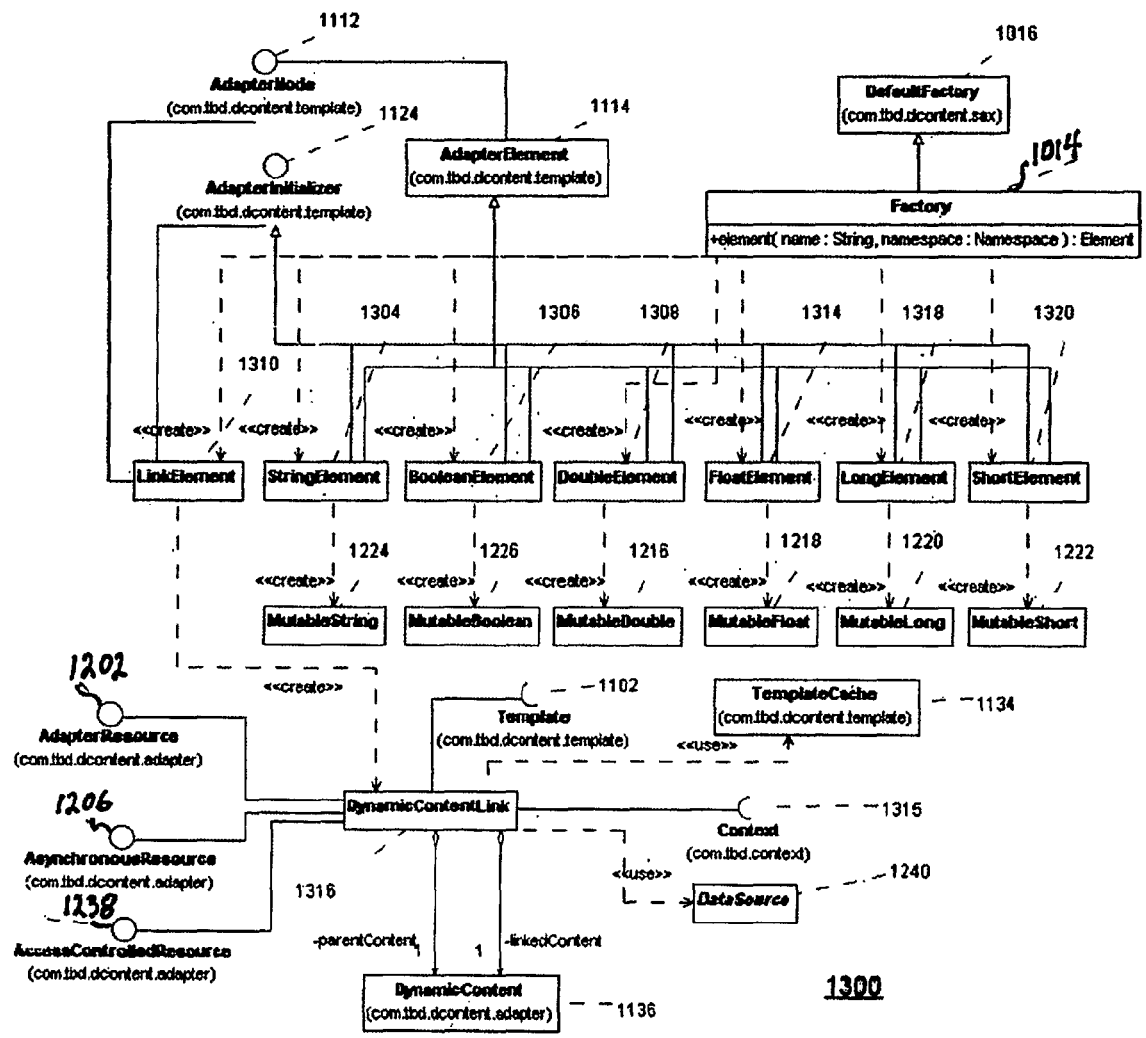
FIG. 13 illustrates primitives datatypes, including a linking mechanism for linking one unit of Content with another.

Introductory comments. Many terms are used according to common usage and understanding.

To aid in the understanding of the invention, we define a selection of terms used in describing the inventions claiming priority from provisional application 60/783,369, PCT patent applications by the same inventors and entitled "Method and System for Integrating Streaming and Static Content" and "JMS Provider with Plug-able Business Logic", incorporated by reference as if fully set forth herein.

Application Context: The collection of Context objects used to allocate the Components for a given Client Application.

Atomicity: atomic change. (from database terminology meaning "all or nothing" for transactions). As used herein, atomic change is multiple changes to individual fields grouped as a discrete event associated with a larger unit of content. Example: the coupling of discrete data (e.g. "bid" and "ask" values) such that in the event of a change affecting one of the couple, updates downstream propagate only when both discrete data in the couple have been updated.

Chained Events: Events relating to Managed Content that are induced, within the scope of an atomic update event, by other changes to Managed Content, e.g. a mid-price is the mean of the "bid" and "ask" values and will change when either the "bid" or "ask" change.

Client Application: An application that interacts with the inventive architecture via some type of distribution protocol or programming interface, e.g. a JMS application or an HTTP application (browser).

Client Library: In a client-server JMS Provider architecture, the client-side library that implements the JMS API.

Component: an object; an instance of some class, or an object with references to other, closely related, objects. Simple components provide a specific type of service to other components; complex components combine many other components directly and indirectly to provide many different services and a high level of functionality. Example 1: a component may provide a simple encapsulation of a JDBC connection or even a pool of JDBC connections. Example 2: a JMS server implementation is a component that uses many other components to support remote JMS client applications. Components have a life-cycle, i.e. they need to be initialized when they are created and also need to know when to release any resources they use that are no longer needed. The component lifecycle is managed by the Component Framework.

Component Framework: A collection of software interfaces and associated implementations whose function is to assemble and initialize Components. The Component Framework manages component lifecycle, allocates and stores components for use by other components.

Content Adapter: A Component whose function is populating and maintaining fields/values in one or more Content Instances. A Content Adapter functions to interpret external data events and apply such external data event to such Content controlled by that Content Adapter.

Content-based permissioning: function of application access control by comparing permission required for a particular Content Instance to permissions associated with the User credential (user identifier) supplied by application; multiple permissioning paradigms are supported as a permission paradigm is assigned to each Content Instance.

Content Cache: A set of Content Templates where each Content Template provides access to one or more Content Instances.

Content Instance: An object comprised of discrete primitive values or fields, which may refer to another Content Instance; a document; a unit of Content. A change in the state or the data associated with a Content Instance is an event.

Content Integration: using a Content Specification that blends data from multiple sources.

Content Integration Framework: In the abstract, the set of Components providing access to Managed Content with a Component Framework.

Content Life-cycle: A process driven by the Content Template comprising the procedure and supporting software interfaces by which a Content Instance is allocated, initialized, maintained or updated, and, finally, released.

Content Link: The run-time object that represents the link between one Content Instance and another.

Content Linking: A mechanism expressed in meta-data and also at run-time by which one Content Specification refers to another and such that Content Instances resulting from a Content Specification with linking meta-data contains a navigible link (Content Link) such that a Distribution Adapter can access data from an arbitrary depth of Content Instances linked in this manner. Content Linking allows the re-use of meta-data and the re-use of run-time resources.

Content Specification: Meta-data; a description used by a Content Template to define the structure of a Content Instance, and to initialize one or more Content Adapters. In the preferred embodiment, a Content Specification is an XML document.

Content Template: An object that uses a Content Specification and Content Adapters to create and maintain a Content Instance. A Content Template is "parametized" such that different parameter values allow for the creation of different Content Instances. A Content Template caches all Content Instances it creates.

Context: An interface; part of the Component Framework providing access to Components; responsible for allocating, initializing and caching Components for use within the application.

Datafeed: A source of streaming data from an external system, e.g. a feed from the New York Stock Exchange (NYSE) or from the Options Price Reporting Authority (OPRA).

Data Model: a collection of Content Specifications as defined by a customer in a particular deployment of the architecture.

Distribution Adapter: A Component whose functions are to encode and distribute Managed Content to downstream applications and also to receive data publishing events from downstream applications and apply such events to Managed Content.

JMS: Java Message Service—a standard Java programming interface (see java.sun.com/products/jms/javadoc-102a/index.html).

JMS Provider: an implementation of the JMS standard.

Managed Content: Content accessed by means of the Content Integration Framework as Content Instances.

Mapping Plug-in: A JMS Plug-in whose function is to map publish and subscribe requests to other Plug-ins based on a configured set of expressions against which topic and queue names are matched.

Plug-able: Component-oriented implementations on a server; wherein dynamic configuration of Components permit flexible "plug-ing in" of different implementations of any given application server paradigm.

Plug-able JMS: Component-oriented implementations on a JMS API supporting simultaneous, different implementations of JMS functionality.

Plug-in: JMS Plug-in: A Component whose function is to provide a specific implementation of the JMS messaging paradigm. For example, the Standard JMS Plug-in provides a "typical" JMS messaging implementation, whereas the Managed Content Plug-in supports publish/subscribe access to Managed Content, and a Mapping Plug-in maps messaging Destinations to other Plug-in by partitioning the namespace of Destination names.

Reference Data: Static data relating to market data, e.g. information as might appear in an annual report.

Schema: a rule-set that governs how a type of data/content is specified. The rule set may be an industry standard, or, where no standard exists, defined by the system architecture. The preferred embodiment uses XML (eXtensible Markup Language) for specifications and XML Schema to define the rule set.

Server application: A collection of one or more Contexts and Components, where a Component is an object (an instance of some class) and a Context provides access to Components. Before presenting the detailed description of the invention, as an aid to understanding the present invention, we briefly summarize aspects of a preferred embodiment more fully set forth in the two applications referenced herein above. The preferred embodiment of the invention set for the herein includes a system architecture, as fully set forth in companion case, entitled "System and Method for Integration of Streaming and Static Data" by the same inventors. The reader should appreciate that a Content Integration Framework provides a real-time transformation and caching capability that obtains data from external sources and transforms such obtained data according to a Data Model defined by an application developer. Client applications may access data from the Content Integration Framework using a variety of different protocols. As generally depicted in FIG. 1, a generalized framework for client/server systems, provides an architecture optimized for real time subscription to static and streaming data, content integration and distribution. The JMS implementation 100 receives input from a variety of streaming and static data sources including middleware 111 (e.g. MDS, TIBCO RV, JMS, MQ Series) as well as reference data 115 and enterprise data (not depicted). As depicted in FIG. 1, a JMS implementation 100 of the invention provides a Component Framework 101. Within the Component Framework 101 a Content Integration Framework 107, including Content Adapters 102, Content Specifications 113, Content Templates 105, and Managed Content 104. The Content Adapters 102 (by way of example) include: Datafeed Adapter 1021; Database Adapter 1022; Analytics Adapter 1023; MDS Adapter 1024; MQ Series Adapter 1025; JMS Adapter 1026; RV Adapter 1027. The Component Framework 101 also includes Distribution Adapters 106. Examples of Distribution Adapters 106 are depicted including JDBC Distribution Adapter 1061; MQ Series Distribution Adapter 1062; MDS Distribution Adapter 1063; SMTP Distribution Adapter 1064; SOAP Distribution Adapter 1065; HTTP Distribution Adapter 1066. The preferred embodiment includes JMS Provider 103, which can be understood to include the Component Framework 101 with the exclusion of the Distribution Adapters 106. The JMS Provider 103 is characterized by a modular architecture, comprised of a variety of plug-ins or modules which serve as extensible mechanisms to insert domain-specific implementations of the JMS messaging paradigm into a server-based JMS Provider infrastructure (also referred to herein as a JMS server plug-in model). Such plug-ins depicted include, by way of illustration, JMS Distribution/Content plug-in 140; Std JMS plug-in 142, Redirect plug-in 144; RV plug-in 146, JMS Plug-in 148; MDS Plug-in 150; MQ series plug-in 152; and Mapping Plug-in 154. The JMS Provider 103 also includes a Server Session 116, a Server Network Connection 117, and a Client Network Connection 119. Further depicted in FIG. 1 are the embedded connection 120, the Client Session 122, and the JMS API 125.

Figure 14:
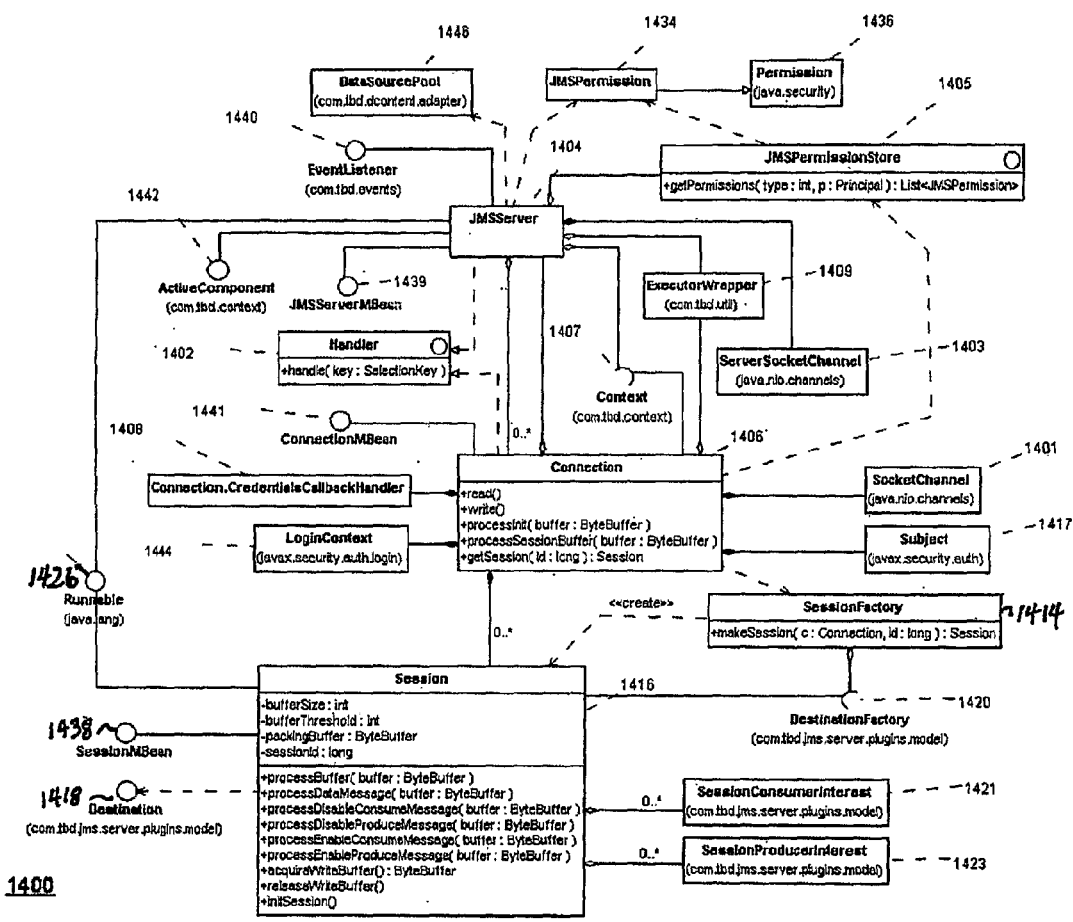
FIG. 14 illustrates the JMS server architecture.

The preferred embodiment of the invention set for the herein also includes a plug-able logic, set forth in companion case entitled "JMS Provider with Plug-able Business Logic" by the same inventors. Detailed descriptions of FIG. 14, (illustrating the JMS server architecture), FIG. 15 (illustrating a Mapping Plug-in) and FIG. 16 (illustrating a Managed Content Plug-in) are set forth therein. Briefly, JMS Client Applications exchange messages using either "topics" or "queues," each being a type of "destination." Topics provide the means for one or more message publishers to reach one or more subscribers in what is known as the "publish/subscribe" paradigm, where a message from a publisher goes to many subscribers. Queues provide a request/response paradigm as is typically used in a client/server relationship. Conceptually, a message sent via a queue goes to a single receiver, which may or may not respond to the sender, depending on the application-level protocol.

The preferred embodiment uses a "plug-able," implementation of its server. The plug-able implementation supports simultaneous different implementations of the JMS functionality. For example, the inventive JMS implementation provides a plug-in that offers typical JMS functionality, as defined by the standard, in which applications send messages to one another using either the topic or queue messaging pattern. The plug-in mechanism is also configurable, and extensible—meaning that the specific set of plug-ins deployed is determined at run-time and can be extended over time. The mapping of topic and queue names to plug-in implementation is configurable, giving a developer or administrator the ability to manage the destination namespace and assign specific names or name hierarchies to a particular type of plug-in. Of interest here are plug-ins whose function is to route JMS messages to and from other middleware infrastructures.

Subscription routing take advantage of the plug-able architecture as described below.

Figure 15:
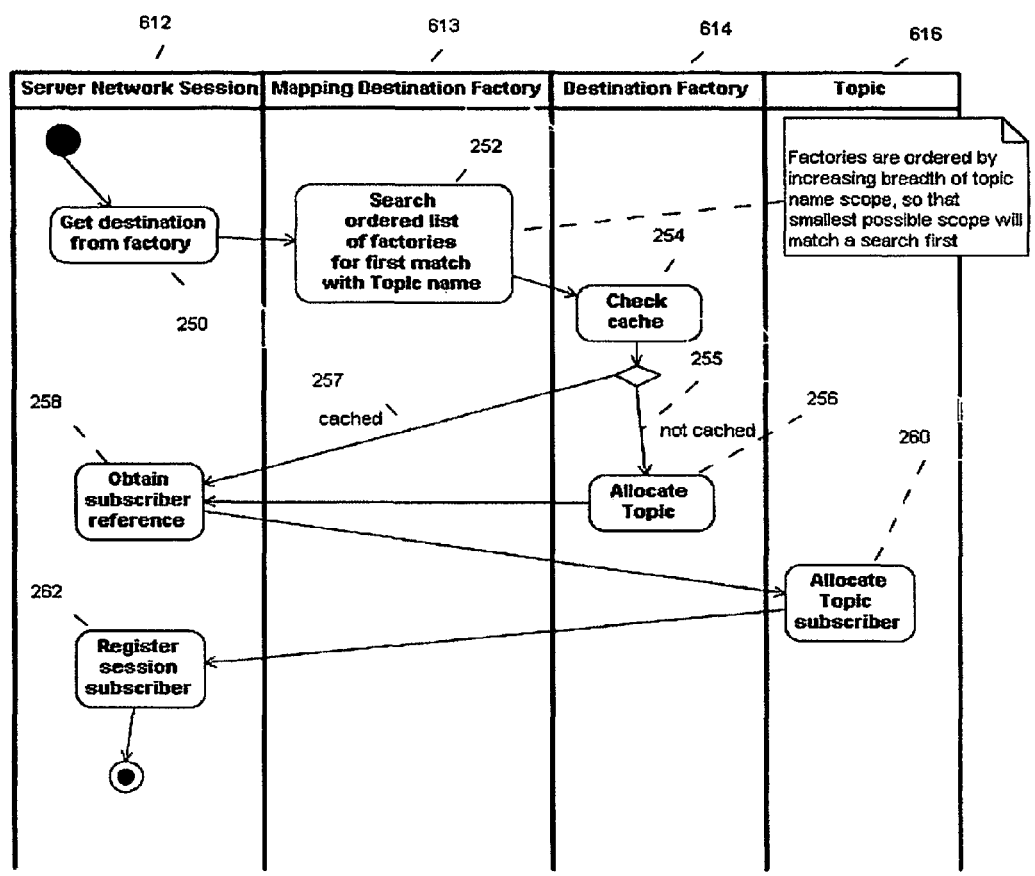
Figure 16:
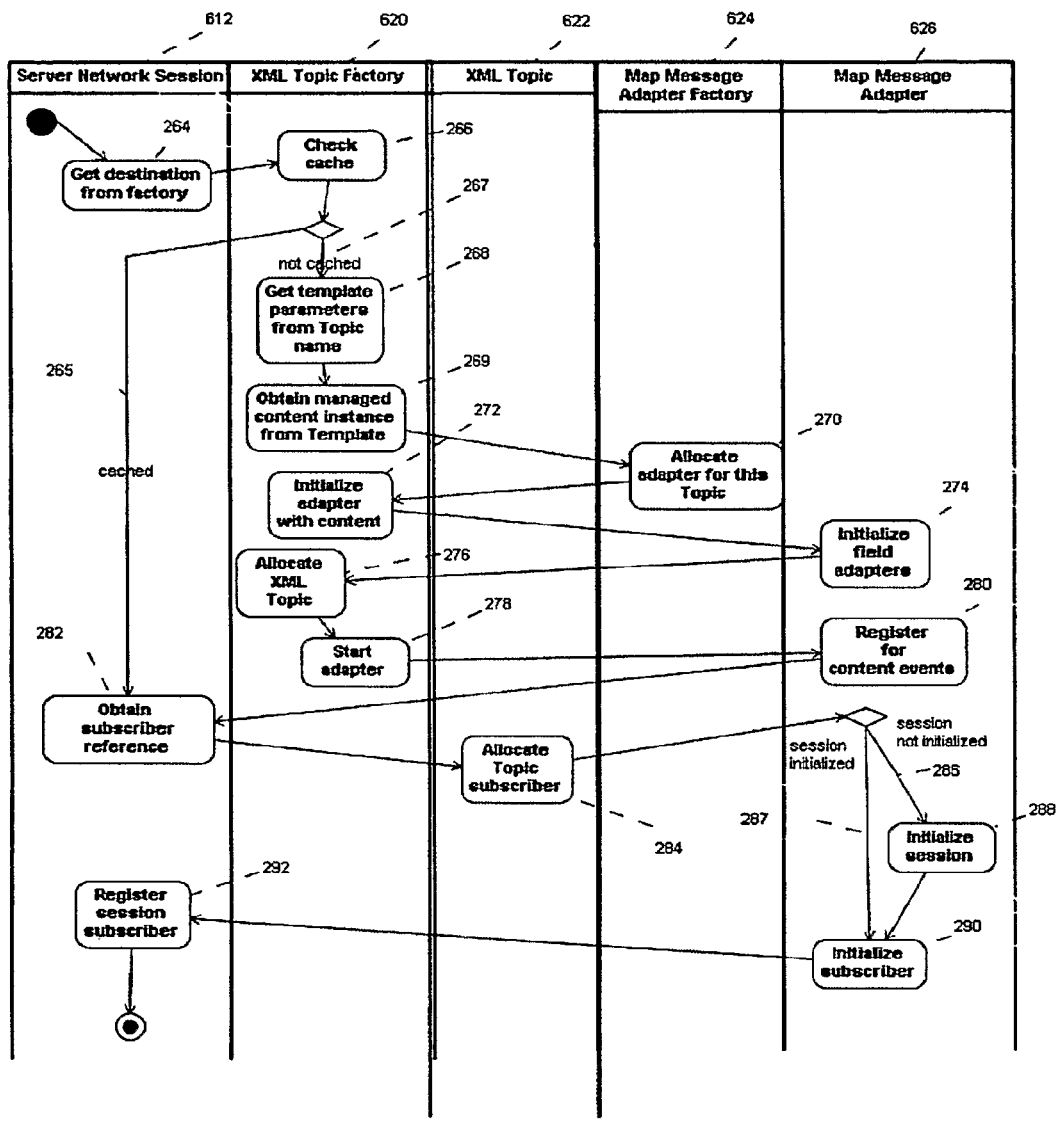

The Mapping Plug-in (depicted in FIG. 15).

Routing Plug-in. When the Application instantiates a topic and creates a subscriber or publisher, the Client Library sends a message to the Server to enable subscription or publication. In the Server the requests are processed by the JMS plugin architecture [reference]. Where the Server is configured to perform routing for a particular topic the request will be handled by a Routing Plug-in. The Routing Plug-in can use whatever knowledge/information is made available to it, including, but not limited to: Control Information received from one Or more participating Servers (such as current load); Content-specific information, such as expected load for the topic (pre-configured or heuristic) as well as, for example, sub-topic synchronization requirements (i.e., can the topic be split); Session-specific information, including but not limited to: i. Quality of Service configured for this topic for the Application Context of the requesting session and ii. the session's policies with respect to re-routes.

The Routing Plug-in returns to the Client Library either a Redirection Directive or a Join Directive. A Redirection or Join Directive indicates alterative connection information for a different server, optionally including a difference Application Context or a different topic name. The Client Library uses the information in a Redirection Directive to requests the topic from those servers. When processing a Redirection Directive the Client Library drops the association between the topic and the original server. When processing a Join Directive the Client Library maintains the original association and adds one or more additional associations with the effect of blending the messages from multiple servers onto a single topic. In all cases, this activity occurs in a manner that is transparent to the Client Application.

Figure 18:
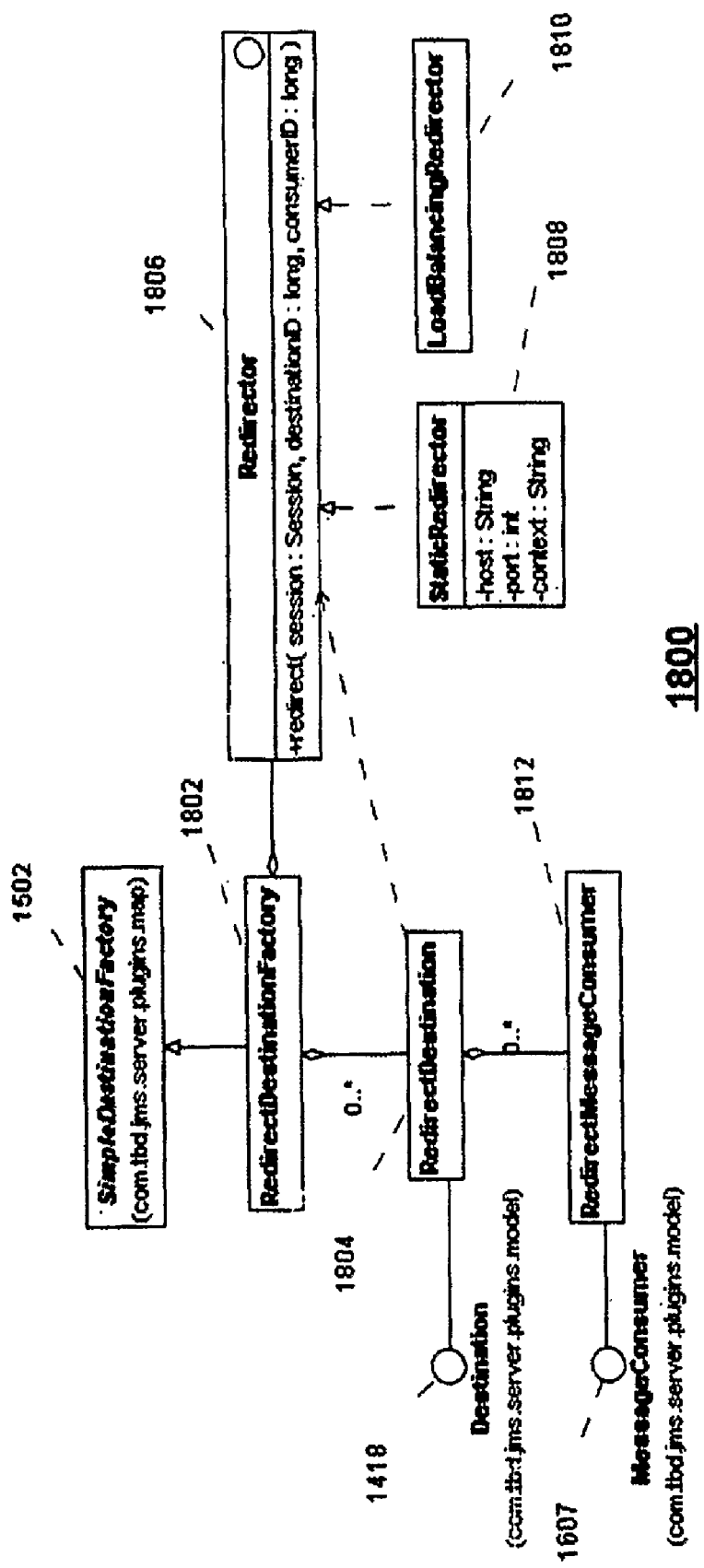
FIG. 18 illustrates a Re-direct Plug-in according to the present invention.

Load Balancing. Subscription load balancing is provided by the invention in a preferred embodiment. Various plug-ins supports various types of destination-level redirection or load-balancing. FIG. 18 illustrates a Re-direct Plug-in.

As depicted in FIG. 18, RedirectorDestinationFactory 1802, a specialization of SimpleDestinationFactor 1502, creates instances of RedirectDestination 1804 and has a reference to some implementation of the Redirector 1806 abstraction. RedirectDestination 1804, an implementation of Destination 1418, uses the Redirector from the factory to redirect all consumers and subscribers. The Redirector 1806 abstraction encapsulates different types of redirection algorithms. StaticRedirector 1808 is an implementation of Redirector configured to redirect requests to a specific host, port, and Context. When combined with a DestinationMap plug-in, this implementation is useful for partitioning servers based on the destination namespace, so, for example, content can be partitioned across multiple servers. Further, the LoadBalancingRedirector 1810 implementation of Redirector monitors a pool of JMS provider implementations that provide equivalent capabilities and redirects requests to different providers based on relative load. The load-balancer and the servers communicate using peer group middleware such as JGroups peer-to-peer communication with a TCP/IP transport [JGRPS]; the servers use JGroups to publish their load-factor.

In an embodiment according to the invention, in a client-side architecture along with associated network protocols, the invention provides mobility of subscriptions from one physical session/connection to another based on directives from a server; and further permit a client to blend multiple physical subscriptions for different data streams into a single logical data stream based on directives from a server.

Figure 19:
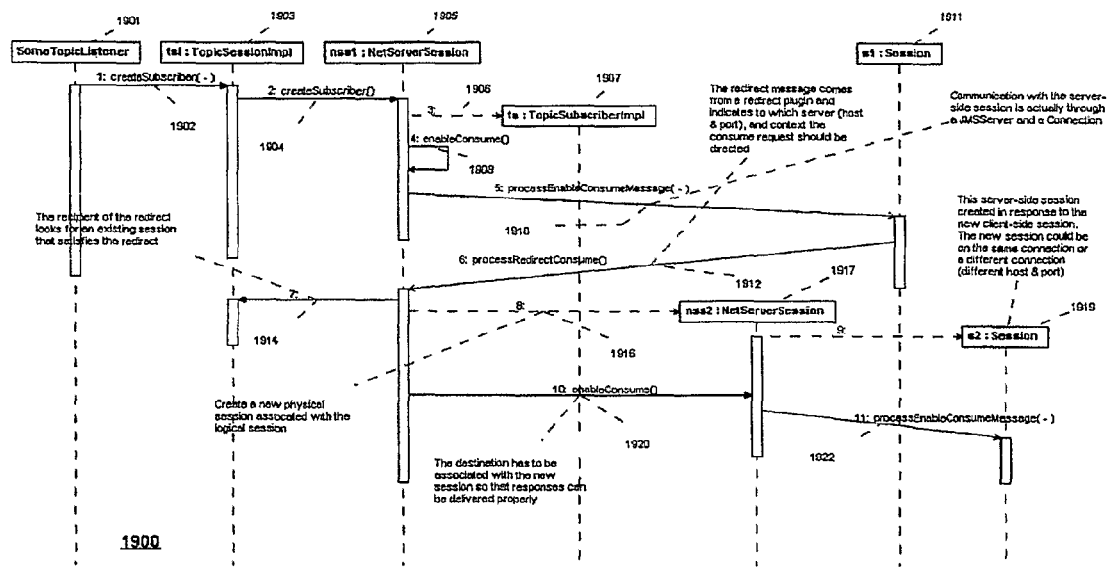
FIG. 19 illustrates subscription load balancing client-side architecture according to the present invention.

Referring to FIG. 19, a UML depiction of interface and network protocols whereby a client-side architecture achieves subscription load-balancing, the method 1900 comprising the steps:

a) create subscriber 1902 (TopicListener 1901 to TopicListenerImpl 1903);
b) create subscriber 1904 (TopicListenerImpl 1903 to NetServerSession:nss1 1905);
c) subscribe to topic 1906 (NetServerSession:nss1 1905 to TopicSubscriberImpl 1907);
d) enable consume 1908 (NetServerSession:nss1 1905);
e) process enable consumemessage 1910 (NetServerSession:nss1 1905 to s1Session 1911); (communication with the server side session through JMS server and connection);
f) process Redirect consume message 1912 (s1Session 1911 to NetServerSession:nss1 1905); (the redirect message comes from re-direct plug-in and the message indicates to which server (host & port) and context the consume request should be directed);
g) get session 1914 (NetServerSession:nss1 1905 to TopicSessionImpl 1903) recipient of the redirect message looks for existing session that satisfies the redirect);
h) create new physical session associated with logical session 1916 (NetServerSession:nss1 1905 to NetServerSession:nss2 1917);
i) create server side session 1918 (NetServerSession:nss2 1917 to s2Session 1919) in response to new client-side session 1916; the s2Session 1919 could be on the same connection or different connection i.e. host & port;
j) enable consume 1920 (NetServerSession:nss1 1905 to NetServerSession:nss2 1917) (the destination has to be associated with new session so responses can be delivered properly;
k) enable consume message 1922 (NetServerSession:nss2 1917 to s2Session 1919).

Figure 20:
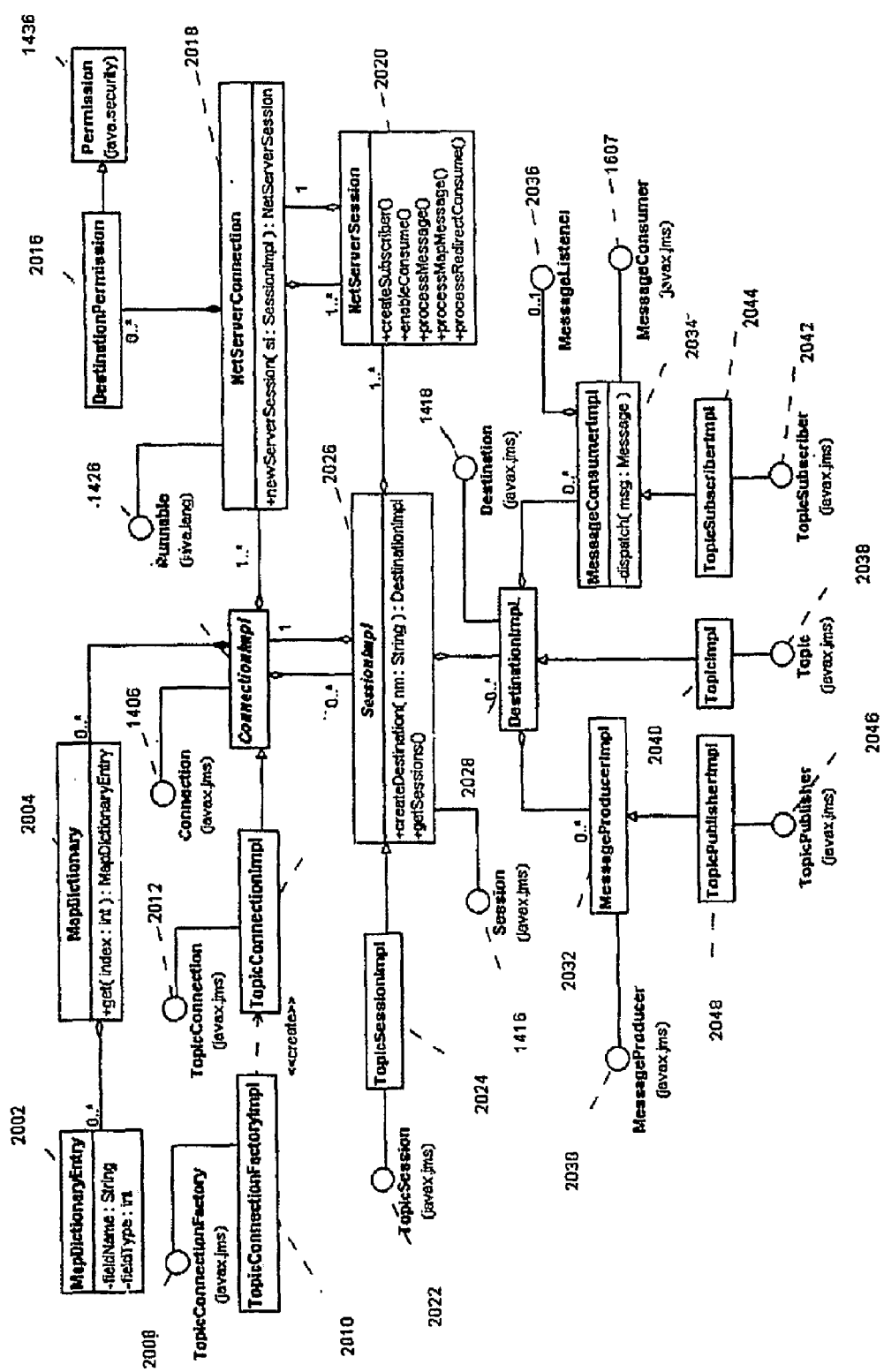
FIG. 20 depicts client-side architecture abstractions that support routing and load balancing according to the invention.

FIG. 20 depicts client server communication whereby load-balancing is achieved according to the preferred embodiment. FIG. 20 presents a logical view of a package providing the inventive implementation of the standard JMS programming interface supporting both Topic and Queue destination types. FIG. 20 depicts the common classes and interfaces as well as the Topic-specific classes. (The Queue-specific classes follow a similar pattern but are not shown here.) Referring to FIG. 20, an abstract class, ConnectionImpl 2006 is the base implementation for the JMS Connection abstraction. A Connection is a logical connection concept defined by the JMS model. The inventive implementation extends this concept to separate the logical connection from the physical implementation and allows a single logical connection to comprise multiple physical connections to one or more remote servers. The separation of physical connections (and sessions) from the logical representation supports various types of load-balancing in which different destinations are assigned to different servers (see FIG. 18). When creating a Connection, a client application may specify the host and port specifically or may rely on the connection factory to decide where to connect to. The inventive implementation provides an extension that allows the client application (or factory) to provide list of possible host/port server end-points (InetSocketAddress). ConnectionImpl 2006 will try each of these in term and attempt to establish an initial physical connection (an instance of NetServerConnection 2018).

A ConnectionImpl 2006 also caches dictionaries used for optimized MapMessage encoding and decoding. This optimization (described in FIG. 17) is supported by some server-side plugin implementations. The cache of dictionaries is built dynamically as entries are sent by the server on an as-needed basis.

The abstract class SessionImpl 2026 is the base implementation for the JMS Session abstraction. A SessionImpl corresponds to the logical session defined by the JMS model. The inventive implementation extends this concept to separate the logical session from the physical implementation and allows a single logical session to comprise multiple physical sessions attached to one or more remote servers. The physical sessions are each represented by an instance of NetServerSession 2020. An instance of SessionImpl creates and caches Destination instances.

The class NetServerConnection 2018 represents a physical connection to a remote server. It implements the standard Java Runnable interface and provides a the execution loop that processes inbound and outbound messages for that particular physical connection. A NetServerConnection establishes the physical socket connection and authentication with a server synchronously, i.e. during initialization it performs blocking I/O and waits for a response from the server. The a positive acknowledgement from the server will include a list of destination-level permissions for the authenticated user. A NetServerConnection supports one or more sessions with the server, each of which is represented by an instance of NetServerSession.

Connection initialization is synchronous—the connection passes credentials to the server and waits for a response. The connection also caches the instances of destination read/write permissions for the authenticated subject by creating a list of DestinationPermission instances. The permission data is sent by the server as part of a successful initialization sequence. A ConnectionImpl also caches the meta-data for destinations that use a compressed MapMessage protocol.

A NetServerSession 2020 represents a physical session established with a remote server and is the main focal point of all session-level messaging. As a client application creates consumers and publishers, NetServerSession enables the flow of messages between client and server and routes messages to and from the server and any consumers and publishers in the client application.

The abstract class DestinationImpl 2028 is the base implementation of the Destination abstraction. An instance of DestinationImpl caches instances of MessageConsumer and MessageProducer and, for client applications that consume messages by polling, implements a message queue.

The class MessageProducerImpl 2032 interacts with a SessionImpl on behalf of a client application end-point that produces messages. The class MessageConsumerImpl 2034 interacts with a SessionImpl on behalf of a client application end-point that consumes messages.

TopicConnectionFactoryImpl 2010 is an implementation of TopicConnectionFactory that creates instances of TopicConnectionImpl. TopicConnectionImpl 2014 is a specialization of ConnectionImpl provides a connection for topic-based communication. TopicSessionImpl 2024 is an implementation of SessionImpl providing the functionality to create concrete instances of topic-specific abstractions—Topic, TopicSubscriber, and TopicPublisher.

TopicImpl 2040—an extension of DestinationImpl that provides a concrete implementation of the Topic abstraction.

TopicSubscriberImpl 2044 is an extension of MessageConsumerImpl that provides a concrete implementation of the TopicSubscriber abstraction. TopicPublisherImpl 2048 is an extension of MessageProducerImpl that provides a concrete implementation of the TopicPublisher abstraction.

In a preferred embodiment, a specific set of servers can be configured as routing servers. The client library sends a topic request to a routing server, which may satisfy the request itself (i.e., act as the content server) or re-route the request to another content server. At any point in time, a single client may be connected to several different content servers.

Furthermore, the inventive method provides that some topics may be split among multiple servers. For example, a topic that resolves to real-time data sourced from a direct exchange feed coupled with reference data sourced from a relational database could be routed to two places: a direct feed that publishes via a multicast protocol and a database-connected server that publishes via TCP; the client library joins the data and presents them to the application as a single topic.

Any system using the method taught herein may be configured to initiate its own rebalancing when necessary, where that is permitted by the sessions. Moreover, the inventive method can work with any other session-oriented paradigm (including JMS).

The invention provides for enabling arbitrarily sophisticated, plug-able algorithms for request routing (including heuristic algorithms).

The present invention is not limited to given embodiments or examples. Notwithstanding that the examples of the invention address the invention as applied to the financial services market, the invention may be implemented in other markets where high volumes of dynamic data, data integration, messaging and transactions are important.

The invention claimed is:

1. A computer readable medium having instructions stored thereon that, when executed by a processor on a first server, causes the processor to load-balance Java Message Service (JMS) requests, the instructions comprising:
   receiving a JMS subscription request from a client, wherein the request comprises a topic name for a topic;
   determining how to service the subscription request;
   based on the determining, servicing the subscription request by generating one or more messages, wherein the one or more messages comprise one of: a plurality of topic messages, a Redirection directive, or a Join directive; and
   sending the one or more messages to the client;
   wherein the Redirection directive comprises directing the client to send the subscription request to a second server;
   wherein the Join directive comprises directing the client to generate a second subscription request to the second server, and in response receive a first part of the topic from the first server and a second part of the topic from the second server.

2. The computer readable medium of claim 1, wherein the determining how to service the subscription request is based on information received from the second server prior to the servicing the subscription request.

3. The computer readable medium of claim 2, wherein the information comprises load information of the second server.

4. The computer readable medium of claim 1, wherein the determining how to service the subscription request is based on an expected load of the topic.

5. The computer readable medium of claim 4, wherein the expected load of the topic comprises a preconfigured load or an heuristic load.

6. The computer readable medium of claim 1, wherein the determining how to service the subscription request is based on whether the topic can be split.

7. The computer readable medium of claim 1, wherein the determining how to service the subscription request is based on a Quality of Service of the topic that is designated for a particular requesting application or a user of the application.

8. The computer readable medium of claim 1, wherein the first part and the second part are joined at the client.

9. The computer readable medium of claim 1, wherein the Redirection directive comprises one or more from the following group: a host name, a port number, a context name and the topic name.

10. The computer readable medium of claim 1, wherein the determining is in the form of logic that is pluggable in the first server.

11. The computer readable medium of claim 1, wherein the topic messages are generated from the first server using a first type of transport protocol, and are generated from the second server using a second transport protocol.

12. The computer readable medium of claim 11, where the first type of transport protocol comprises a direct feed that publishes via a multicast protocol, and the second type of transport protocol comprises a database-connected server that publishes via Transmission Control Protocol.

13. A computer implemented method for load-balancing Java Message Service (JMS) requests, the method comprising:
  receiving a JMS subscription request from a client at a first server, wherein the request comprises a topic name for a topic;
  determining how to service the request;
  based on the determining, servicing the request by generating one or more messages, wherein the one or more messages comprise one of: a plurality of topic messages, a Redirection directive, or a Join directive; and
  sending the one or more messages to the client;
  wherein the Redirection directive comprises directing the client to send the subscription request to a second server;
  wherein the Join directive comprises directing the client to generate a second subscription request to the second server, and in response receive a first part of the topic from the first server and a second part of the topic from the second server.

14. The method of claim 13, wherein the determining how to service the request is based on information received from the second server prior to the servicing the request.

15. The method of claim 14, wherein the information comprises load information of the second server.

16. The method of claim 13, wherein the determining how to service the request is based on an expected load of the topic.

17. The method of claim 16, wherein the expected load of the topic comprises a preconfigured load or an heuristic load.

18. The method of claim 13, wherein the determining how to service the request is based on whether the topic can be split.

19. The method of claim 13, wherein the determining how to service the request is based on a Quality of Service of the topic that is designated for a particular requesting application or a user of the application.

20. The method of claim 13, wherein the first part and the second part are joined at the client.

21. The method of claim 13, wherein the Redirection directive comprises one or more from the following group: a host name, a port number, a context name and the topic name.

22. The method of claim 13, wherein the determining is in the form of logic that is pluggable in the first server.

23. A system for load-balancing Java Message Service (JMS) requests, the system comprising:
  a processor;
  a computer readable medium coupled to the processor, wherein the computer readable medium stores instructions that cause the processor to perform the functionality of:
  receiving a JMS subscription request from a client at a first server, wherein the request comprises a topic name for a topic;
  determining how to service the request;
  based on the determining, servicing the request by generating one or more messages, wherein the one or more messages comprise one of: a plurality of topic messages, a Redirection directive, or a Join directive; and
  sending the one or more messages to the client;
  wherein the Redirection directive comprises directing the client to send the subscription request to a second server;
  wherein the Join directive comprises directing the client to generate a second subscription request to the second server, and in response receive a first part of the topic from the first server and a second part of the topic from the second server.

24. The system of claim 23, wherein the determining how to service the request is based on information received from the second server prior to the servicing the subscription request.

25. The system of claim 23, wherein the information comprises load information of the second server.

26. The system of claim 23, wherein the determining how to service the request is based on an expected load of the topic.

27. The system of claim 26, wherein the expected load of the topic comprises a preconfigured load or an heuristic load.

28. The system of claim 23, wherein the determining how to service the request is based on whether the topic can be split.

29. The system of claim 23, wherein the first part and the second part are joined at the client.

30. The system of claim 23, wherein the Redirection directive comprises one or more from the following group: a host name, a port number, a context name and the topic name.

31. The system of claim 23, wherein the determining how to service the subscription request is based on a Quality of Service of the topic that is designated for a particular requesting application or a user of the application.

* * * * *